Figure 1:
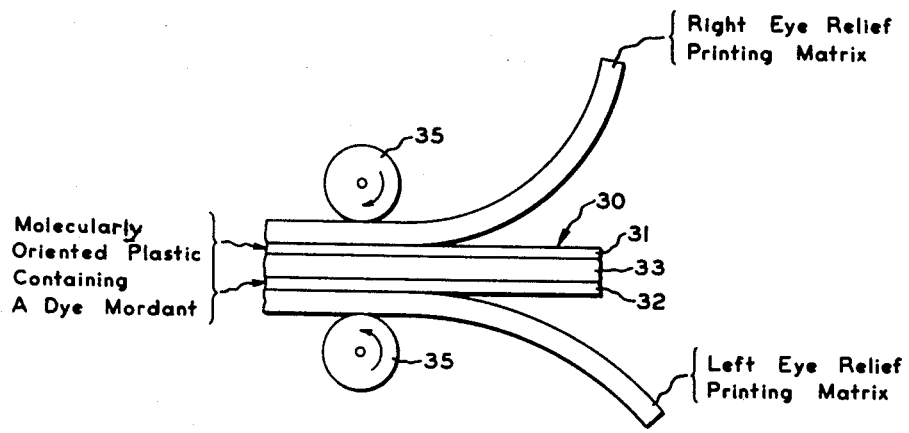

April 5, 1960　　　　E. R. BLOUT ET AL　　　　2,931,271
SHEET STOCK FOR DICHROIC DYE LIGHT-POLARIZING
MEANS AND PROCESS OF PREPARATION
Filed Aug. 3, 1955

INVENTORS
Elkan R. Blout
William H. Ryan
Vivian K. Walworth
Howard C. Haas
BY Broward Mikulka
and
Moncure D. Berg
ATTORNEYS

United States Patent Office 2,931,271
Patented Apr. 5, 1960

2,931,271

SHEET STOCK FOR DICHROIC DYE LIGHT-POLARIZING MEANS AND PROCESS OF PREPARATION

Elkan R. Blout, Belmont, William H. Ryan, Billerica, Vivian K. Walworth, Concord, and Howard C. Haas, Arlington, Mass., assignors to Polaroid Corporation, Cambridge, Mass., a corporation of Delaware Application August 3, 1955, Serial No. 526,301

19 Claims. (Cl. 88—65)

This invention relates to improvements in sheet stock of the character rendered light polarizing by the incorporation therein of one or more dichroic dyes, and especially sheet stock in the form of photographic film adapted to carry light-polarizing dichroic dye images, as well as to improved products resulting from the predetermined dyeing of sheet stock of the nature described whereby to render the stock light polarizing wherever dye is present therein.

Objects of the invention are to provide improved sheet stock, especially sheet stock in the form of motion picture and cut film, for the reception of dichroic dyes and comprising one or more layers of an orientable, dyeable, transparent, high molecular weight, hydroxyl-containing, vinyl polymer which has the molecules thereof highly oriented in a predetermined direction and in which there is, as a dye mordant or fixing agent, an amino-containing polyethylenic compound, i.e., a basic polyethylenic compound.

Other objects of the invention are to provide sheet stock products, especially in the form of film stock, comprising a support carrying thereon a dyeable layer of an image-receptive material comprising a sheet of an oriented, plastic polymer of the character described and including therein as a dye mordant a substantially uniform distribution of an organic substance comprising an amino-substituted linear polymer from the class consisting of (a) amino-substituted alkanes containing at least one member derived from the group consisting of vinyl and allyl groups, (b) heteropolymers comprising amino-substituted alkanes and an alkane group containing at least one member of the group consisting of hydroxyl, carboxyl, halogen, ester groups, acetal, carbethoxy, aminoethoxy and keto, and (c) heteropolymers comprising an amino ether group and an alkane group containing at least one member from the group consisting of hydroxyl, carboxyl, halogen, ester groups, acetal, carbethoxy and keto; to provide a product having a transparent support carrying a pair of image-receptive layers, especially on opposite sides of said support, and with said product comprising sheets of an orientable polymer of the character described with each of said sheets having incorporated therein as a dye mordant a basic nitrogen-containing polymer which is a derivative of polyethylene and with said sheets being molecularly oriented so that the direction of orientation of the molecules of one of said layers is at 90° to the direction of orientation of the molecules of the other image-bearing layer whereby to provide film stock useful for forming light-polarizing stereoscopic image pairs thereon and comprising dye images.

Further objects of the invention are to provide a light-polarizing product especially of the photographic type and comprising at least one layer of a transparent, high molecular weight, hydroxyl-containing, vinyl polymer having the molecules thereof predeterminedly oriented and including a substantially uniform distribution of a basic polyethylenic compound as a dye mordant therein, together with at least one dichroic dye held fast in said layer by said mordant and rendering said layer, wherever present, light polarizing, and especially a product wherein said dye is differentially dispersed to provide a photographic image of a light-polarizing nature; and to provide products of the character just described, including multicolor images formed of appropriately colored dichroic dyes and especially such products which carry one or more stereoscopic pairs of dichroic dye images.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

Figure 2:
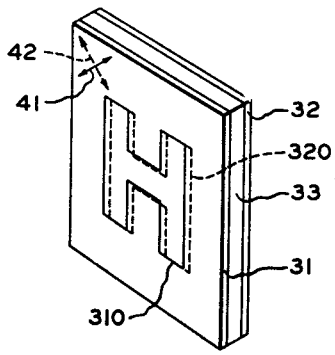

For a fuller understanding of the nature and objects of the invention, reference should be had to the following detailed description taken in connection with the accompanying drawing wherein:

Figure 1 is a diagrammatic illustration showing the manner of forming pairs of superposed light-polarizing stereoscopic dye images in stereoscopic film stock by the application to each side of the film stock of a printing matrix which contains, as a relief image, one of a stereoscopic pair of images to be printed and which is wet with a dichroic dye; and Fig. 2 is a diagrammatic perspective view of a stereoscopic color print produced on the steroscopic film stock by the procedure illustrated in Fig. 1.

One practice for producing a light polarizer is to adsorb a dichroic dye in a transparent, molecularly oriented, linear, high molecular weight, hydroxyl-containing, vinyl polymer of which a preferred example is polyvinyl alcohol. Wherever a dichroic dye is adsorbed in a molecularly oriented plastic sheet of this nature, it renders the sheet light polarizing. Oriented plastic materials of the character described are useful to provide dye polarizers and are particularly suited as a medium for providing stereoscopic, light-polarizing prints in color.

While dye mordants have in the past been dispersed or incorporated in a wide variety of dyeable materials to assist in the dyeing thereof, it has only recently been discovered that certain types of mordants may be added to a linear, high molecular weight, hydroxyl-containing, vinyl polymer substantially without effect upon the orientation properties of the polymer whereby to provide a product of good optical homogeneity useful as stock capable of being rendered light polarizing where dyed with a dichroic dye and comprising a sheet of said polymer in which the molecules thereof are in a high state of molecular orientation as a result of the stretching of said sheet and in which a dye mordant is substantially uniformly distributed.

A dye mordant which is distributed in a molecularly oriented plastic sheet provides an effective mechanism for assuring the faithful reproduction in an image printed on the sheet of the resolution of a matrix image contained in a washoff relief printing matrix in instances where an aqueous solution of a dichroic dye absorbed into said printing matrix is penetrated into said sheet by transfer thereto from the printing matrix which is pressed into contact therewith. Also, a dye mordant dispersed in a molecularly oriented plastic sheet is an effective mechanism for assuring that dye, in a quantity sufficient to give a desired dye density of high order, is penetrated into the sheet wherever an aqueous solution of said dye is contacted with said sheet to carry out the dyeing thereof.

In regard to the term "dye mordant" or "mordant," it is recognized that "a substance which holds the dye in place is called a mordant." Page 268, "Principles of Color Photography" (1953) by Ralph M. Evans, W. T. Hanson, Jr. and W. Lyle Brewer, John Wiley and Sons, Inc., New York; and by the use of the terms "dye mordant" or "mordant" in the specification and claims hereof, there is meant a substance of the nature just described.

Until quite recently, the incorporation of a polymeric dye mordant in molecularly oriented sheet stock of the character used in the formation of dichroic dye polarizer means has been unknown, the first disclosure of a product of such nature appearing in U.S. Patent No. 2,868,077, issued on January 13, 1959.

The just-mentioned application discloses and claims, in conjunction with molecularly oriented plastic sheet and as dye mordants suitable for incorporation therein, substances which are generically characterized as falling within the class of organic compounds which contain basic nitrogen. The present invention is concerned with products comprising molecularly oriented layers or sheets of transparent, high molecular weight, hydroxyl-containing, vinyl polymers such as polyvinyl alcohol wherein there is included as a dye mordant a substance chosen from and limited to a subgroup of the generic class of mordants named in said application and restricted to a subgroup which is not specifically disclosed in said application and which embraces amino-containing or basic polyethylenic compounds.

In this regard, the dye mordants with which this invention is concerned are all derived from ethylenic compounds and, more specifically, each basic mordant of the present invention may be characterized as comprising an amino-substituted linear polymer from the class consisting of (a) amino-substituted alkanes containing at least one member derived from the group consisting of vinyl and allyl groups, (b) heteropolymers comprising amino-substituted alkanes and an alkane group containing at least one member of the group consisting of hydroxyl, carboxyl, halogen, ester groups, acetal, carbethoxy, aminoethoxy and keto, and (c) heteropolymers comprising an amino ether group and an alkane group containing at least one member from the group consisting of hydroxyl, carboxyl, halogen, ester groups, acetal, carbethoxy and keto.

As will be understood, the basic mordants just set forth may also be described as basic nitrogen-containing polymers which are derivatives of polyethylene. While, in general, polymers of this character are prepared by the modification of previously polymerized ethylenic polymers and c opolymers rather than by the direct polymerization of appropriate monomers, the final products with which this invention is concerned may be considered as substituted polyethylenes or heteropolymers of substituted ethylenes. In polyamines of the character with which this invention is concerned, the carbon backbone has one H (hydrogen atom) on alternate methylenic groups replaced by the $NR_2$ group; or has one H on alternate methylenic groups replaced by the $CH_2NR_2$ group; or has one H on alternate methylenic groups replaced by the $$OCH_2CH_2NR_2$$

group where R may be hydrogen or alkyl. Compounds of this nature include heteropolymers of vinyl amines or allyl amines or β-aminoethoxyethylene with each other or with ethylenic residues not containing basic nitrogen which are substituted appropriately, depending upon the original monomer, by hydroxyl, carboxyl, halogen, ester groups, acetal, carbethoxy and keto. In accordance with the usual characteristics of addition polymerization, the ethylenic residues of the polymer chain will be arranged head to tail and in copolymers the sequence length distribution will be governed by the theoretical considerations applying to addition copolymerization and the relative reactivities of the monomers employed in the preparation of the initial copolymer, prior to modification.

To name some specific compounds which fall within the broad meaning of ethylenic mordants, mention is made of polyvinylamine hydrochloride; polyallylamine hydrochloride; a copolymer of vinyl alcohol and vinylamine, i.e., a polyvinyl alcohol having some of the hydroxyl groups substituted by amino groups; a copolymer of vinyl alcohol and allylamine; and partial β-aminoethyl ethers of polyvinyl alcohol as for example an ether prepared by the reaction of polyvinyl alcohol and ethylene imine.

Certain important properties possessed by the basic mordants with which this invention is concerned make them highly desirable for distribution in oriented plastic sheets such as polyvinyl alcohol. For example, many of the compounds named herein are water soluble and if water insoluble are easily converted to a water-soluble salt, for instance, a hydrochloride. The solubility of these basic polyethylenic compounds facilitates their addition to plastic sheet, such as polyvinyl alcohol. Thus, an aqueous solution of the basic compound may be imbibed into a cast plastic sheet or such a compound may be dissolved in the aqueous casting composition of the polymer from which the sheet itself is formed.

Additional important properties of the amino-containing or basic polyethylenic compounds reside in the fact that they are in general highly transparent and generally are compatible with hydroxyl-containing, vinyl polymers which comprise the plastic sheet products. The properties of the basic polyethylenic compounds relating to their transparency and compatibility with the plastic carrier make it possible to provide sheet products which possess excellent optical homogeneity while including a dye mordant as an additive in the product. Furthermore, it may be stated that a basic polyethylenic compound present in an unoriented plastic sheet remains substantially unaffected upon stretching the sheet to orient the sheet molecules and seems to exert no appreciable effect upon the sheet itself during said stretching whereby the optical homogeneity of the sheet remains substantially unimpaired.

Also, many of the basic ethylenic type mordants with which this invention is concerned possess large molecule size while all mordant compounds of this type display good substantivity to hydroxyl-containing vinyl polymers so that, when incorporated in plastic sheet of the character with which this invention is concerned, these mordants are immobilized therein, at least to an extent sufficient to prevent their complete removal therefrom by being washed out of the sheet in aqueous processing solutions employed in the predetermined dyeing of the sheet.

Some explanation of the nature of the molecularly oriented sheet stock and the manner of rendering the same light polarizing by the predetermined application of dichroic dyes to the stock here seems desirable for a fuller understanding of the invention.

In this regard, a suitable medium in which superposed, light-polarizing stereoscopic left- and right-eye images may be formed is provided by the stereoscopic film stock or printing blank 30 illustrated in Fig. 1 as comprising a laminar structure having two thin and transparent surface layers 31 and 32 mounted upon the opposite sides of a transparent support 33. The surface layers 31 and 32 are thin sheets of a transparent, molecularly oriented, high molecular weight, hydroxyl-containing, vinyl polymer of which a preferred example is polyvinyl alcohol, while the support 33 is any suitable transparent and substantially water-impermeable plastic such as cellulose acetate butyrate or cellulose triacetate.

Preferably the layer 31 has its molecules so oriented that the transmission or polarizing axis of the layer will be at 45° to the edge of the film stock 30, while the layer 32 has its molecules so oriented that the transmission or polarizing axis of the layer will also be at 45° to the edge of the film stock but will make an angle of 90° with the transmission axis of the layer 31. This preferred orientation for film stock is indicated by the arrows 41 and 42 in Fig. 2 which schematically illustrates film stock 30 after image formation therein.

Film structures of this general nature are disclosed in U.S. Patents Nos. 2,289,714, 2,289,715 and 2,315,373. The film stock 30 provides a transparent structure useful as motion picture film or cut film. Additionally, the film stock 30 may be mounted upon an opaque, nondepolarizing, reflecting base and used for the formation of light-polarizing reflection prints. Stereoscopic image pairs formed in the film stock 30 will be located in superposed relation to each other.

Image formation in the film stock 30 is carried out by printing with washoff relief matrices. The washoff relief matrices are prepared from photographic originals or duplicates thereof by conventional practices and, after imbibition of a solution of dichroic dye therein, are pressed into contact with the outer faces of the layers 31 and 32 to transfer portions of said solution to each of said layers.

Two sets of printing matrices, one for the right-eye image and one for the left-eye image, are used for the positive reproduction of a stereoscopic pair of images. For color positives, each set of matrices comprises two individual relief matrices which each bear a positive color separation record of one image of the stereoscopic pair of images to be reproduced. The individual matrices in a set used for color reproduction are printed successively on the stereoscopic film stock, for example the matrices representative of the cyan, magenta and yellow components of the color image to be reproduced may be applied to the film stock in the order just named.

A convenient means for simultaneously printing on opposite sides of the film stock 30 is schematically illustrated in Fig. 1 wherein the film stock 30 with a right-eye printing matrix and a left-eye printing matrix superposed on opposite sides thereof is shown as being passed between two rotating pressure-applying rolls 35 which cause the matrices to be pressed into intimate contact with the outer molecularly oriented layers 31 and 32 of the film stock.

A print or product resulting from the utilization of the procedure illustrated in connection with Fig. 1 is diagrammatically shown in Fig. 2 wherein film stock 30 is illustrated as containing a right-eye stereoscopic image 310 in the molecularly oriented layer 31 and a left-eye stereoscopic image 320 in the molecularly oriented layer 32. Image 310 is shown in full lines while image 320 is shown in dotted lines. For the purposes of simplification, the print shown in Fig. 2 has been considered as derived from a pair of stereoscopic records of the letter H and, in accordance with the process heretofore described, may be considered as providing a full-color stereoscopic print.

Viewing is carried out by observing these light-polarizing images 310 and 320 through polarizing filters located in front of each eye of the observer with the transmission axes thereof positioned at 90° to each other. Additionally, the light-polarizing filters are so positioned with respect to the light-polarizing images in the film 30 that each has its respective polarizing axis crossed or at 90° to the polarizing axis of the image to be observed therethrough. In this way, each eye sees substantially only the image intended for it.

As has been intimated, the employment as mordants of these basic nitrogen-containing polymers which are derivatives of polyethylene is not limited to their incorporation in molecularly oriented sheet stock in which a light-polarizing image is to be provided. Mordants of this type are useful in sheet stock which is to be rendered light polarizing all over, as for example, by imbibition into the sheet of a dichroic dye solution in which the sheet is immersed or which is otherwise applied to at least one surface of the sheet to uniformly wet the same as by being flowed or sprayed onto said surface. Sheet structures suitable for conversion into dichroic dye polarizers in general comprise a transparent support such as the support 33 to which is adhered a molecularly oriented sheet, as for example the sheet 31. Structures of this general nature and suitable for providing overall dichroic dye polarizers are disclosed in Patent No. 2,237,567, issued April 8, 1941.

The molecular orientation of a plastic sheet is customarily carried out by stretching the sheet in the presence of heat and by the application to the sheet of opposed tensional forces. As will be well understood, the result of such stretching is to cause orientation of the molecules of the sheet in a direction which is substantially parallel to the direction of application of the opposed stretching forces.

The degree of stretching imparted to a plastic sheet is empirically measured by what is called the axial ratio which is a quantity determined by the ratio of the major axis to the minor axis of the ellipse appearing on the plastic sheet after it is stretched and derived as a result of the stretching of said sheet from a circle printed on the sheet before stretching. In general, the higher the axial ratio, the higher the efficiency of the sheet as a light polarizer. Axial ratios of the order of 3 and greater are of a nature suitable for providing molecularly oriented sheet of high orientation. Current production practices are consistently carried out to provide axial ratios of around 6 for molecularly oriented polyvinyl alcohol sheet. The present invention is concerned with molecularly oriented plastic sheet stock which has an axial ratio of, or higher than, the order just noted and in which an amino-containing polyethylenic compound is distributed.

The mordant is incorporated in plastic sheet stock, such as the film stock 30, by imbibition therein or is incorporated in the plastic dope or casting composition adapted to provide the layers of the stock which are to be oriented. In instances where the mordant is included in the casting composition, the layers formed by the casting process are stretched and then laminated to a support.

The following examples, illustrative of a variety of basic polyethylenic compounds which are useful as mordants, will serve to set forth methods by which said mordants are incorporated in sheet stock of the character with which this invention is concerned.

*Example 1*

An aqueous solution of from about 1% to 10% of polyvinylamine hydrochloride of a molecular weight of about 350,000 is prepared by dissolving an appropriate amount of polyvinylamine hydrochloride in a known volume of water. Polyvinylamine hydrochloride solution is substantially uniformly applied onto a surface of a molecularly oriented plastic layer such as the layers 31 and 32 of the film stock 30 by any conventional means.

Contact of the mordant solution with the sheet stock is maintained for a time period which is sufficient to permit the formation of a stratum of said mordant at least adjacent the surface of the layer so treated. This contact of the mordant solution with the layer is usually carried out for about from one to several minutes at room temperature or higher. Following imbibition of the mordant in the sheet stock, excess liquid on the surface of the stock is removed by conventional means. A dichroic dye solution may be applied onto the surface of the mordanted and oriented sheet stock immediately after the incorporation of the mordant therein although in the usual course of events, the sheet stock will be in a dry condition prior to carrying out subsequent practices of the nature described herein for effecting the dyeing of the stock.

The quantity of a basic polyethylenic compound distributable in a plastic sheet by a so-called imbibition practice such as that just described is, for a variety of reasons, somewhat limited. Considerably higher concentration of a basic mordant in plastic sheet may be obtained by including the mordant in the composition from which the sheet is cast as by the procedure set forth in the examples which follow. However, regardless of how the mordant is associated with the plastic sheet stock, it may be stated that even a low concentration thereof is effective in carrying out the aims and objects of this invention.

The mordant concentration obtainable in plastic sheet stock will depend upon a number of factors, such for example, as the compatibility of the mordant with the plastic of the sheet, the molecule size of the mordant, the manner in which the mordant is incorporated in the plastic sheet, i.e., by imbibition or by inclusion in the casting composition, and by other related factors. The higher mordant concentrations are preferred and in this regard plastic sheet in which the mordant has a concentration of about 7% may be mentioned as a generally acceptable all-purpose figure in connection with the basic mordants of this invention.

*Example II*

A 10% solution of polyvinyl alcohol is provided by dissolving an appropriate quantity of polyvinyl alcohol in water. The polyvinyl alcohol solution is heated at about 95° F. until it becomes homogeneous, and to the hot solution there is added an aqueous solution of polyvinylamine hydrochloride of approximately 350,000 molecular weight to provide a concentration of the polyvinylamine hydrochloride of from 1% to 10% in sheet which is cast from this mixture. This mixture is suitably stirred until thoroughly mixed and is heated for from 5 to 20 hours at about 95° F. or until all air in the mixture has been driven out, following which the mixture of polyvinyl alcohol and the polymeric mordant is cast by conventional practices to provide sheet products. The cast sheet is then subjected to stretching to orient the molecules thereof to a desired degree and is laminated to a support such as the support 33 of the film stock 30 to provide a dyeable product.

In Examples I and II the use of polyvinylamine hydrochloride of a molecular weight of 350,000 has been set forth. This invention contemplates the use of polyvinylamine hydrochlorides of lower and higher molecular weight than that specified. In general, however, mordants of relatively high molecular weight are preferred in the practice of the invention as they are more difficult to bodily remove from molecularly oriented sheet stock by being washed out of the same than are mordants of lower molecular weight.

*Example III*

A copolymer of vinyl alcohol and vinylamine in a quantity similar to that of polyvinylamine hydrochloride of Example II is similarly incorporated into a casting composition of polyvinyl alcohol. This casting composition is cast into a sheet and subsequently stretched as specified in Example II to provide molecularly oriented sheet stock containing as a mordant a copolymer of vinyl alcohol and vinylamine.

By one specific procedure for forming a copolymer of vinyl alcohol and vinylamine as set forth in Example III, 63 grams of vinyl acetate, 7 grams of N-vinyl phthalimide and about 0.350 grams of benzoyl peroxide were sealed in a tube and polymerized at 60° C. until slightly translucent (for a time period of about two to three hours). The copolymer prepared by this method, which was in a quantity of approximately 10.0 grams, was separated by precipitation with methanol and the separated polymer was dissolved in purified dioxane (approximately 200 ml. dioxane), to which was added 30 ml. of hydrazine, 15 ml. of water and the mixture was left overnight. Using an oil bath and stirring, the just-described mixture was refluxed for about two hours following which the reaction mixture was slowly added to excess acetone and precipitated to isolate the polymer. The precipitated polymer was redissolved in water and reacted with 30 ml. of 6-N sulphuric acid while undergoing heating over a steam bath for a period of about an hour. Following this treatment, the polymer was reprecipitated with acetone and redissolved in water to obtain a milky suspension which was poured into excess methanol. The precipitate obtained during treatment with methanol was dissolved in water to provide a clear solution from which the final product can be reprecipitated in acetone. The last-mentioned precipitate was dried overnight at less than 2.0 mm. pressure and at 45° C. This resulted in the copolymer of Example III and gave a yield of 5.5 grams thereof.

*Example IV*

20 grams of polyvinyl alcohol and 5 grams of ethylene imine were placed in a pressure bottle and heated at 100° C. for 18 hours. The reaction product obtained in this manner was washed with methanol and then with acetone and dried. This reaction product comprises a powder-like material and material of relatively large size or in lumps. The larger material was the more highly reacted and this was separated from the powder after washing and drying. Analysis of the lump-like material showed that it contained 6.5% of combined ethylene imine by weight.

The lumpish material was dissolved in an appropriate quantity of water to provide a suitable casting mixture which was cast into a sheet. The cast sheet was stretched to orient the molecules thereof to a desired degree. Following this, the oriented sheet, which comprises a β-aminoethyl ether of polyvinyl alcohol, was laminated to a support such as the support 33 of the film stock 30 to provide a dyeable product.

Benefits which accrue from the use of dye mordants in dyeing processes are well illustrated in connection with the printing of dichroic dye images in molecularly oriented sheet materials which contain such a mordant. In this regard, the mordant assists in image formation in the oriented plastic sheet by effecting a more rapid dye transfer from printing matrices contacted with the sheet, as well as a more complete dye transfer from the matrices and lead to the formation of transfer images which faithfully reproduce the resolution of the matrix image and which possess high dye densities. In addition, the incorporated dye mordant assists in improving the wash fastness of the dye in the oriented layer.

Organic compounds, such for example as the basic polyethylenic compounds disclosed as mordants by this invention, are recognized as being electron donors and are intended herein for employment with dichronic dyes which are in general provided by that class of dyes known as direct cotton dyes. Useful dichroic dyes include acid residues in their molecular structure, as for example a sulfonic acid group or a phenolic group. Dichronic dye compounds of this nature are recognized as being electron acceptors. The mechanism by which the basic polyethylenic compounds are able to fix or hold fast dischroic dyes in molecularly oriented layers is not clearly understood but is believed to be the result of a salt-forming reaction wherein one or more amino groups of the mordant react with an acid residue of the dye.

Transfer printing is carried out with the film stock in a wetted condition whereby to assure good overall contact between the surface being printed and the relief printing matrix pressed thereon. Such wetting of the film stock may be with water. One effect of stretching a plastic sheet, such as polyvinyl alcohol, is to cause the sheet to develop a resistance to dissolution in aqueous solution at given temperature. In general, this decrease in solubility of the plastic material in aqueous solution is a function of the degree of its molecular orientation. Such decrease in the solubility of the plastic material affects the ability of an aqueous solution to permeate a sheet of the same and, at least to some extent, affects the printing in the sheet by dye transfer processes of light-polarizing images formed of dichroic dyes. In instances where a mordant is insufficient to overcome these undesired conditions in highly molecularly oriented plastic sheeting of the character with which this invention is concerned, it becomes desirable to prewet the sheet with suitable reagents in aqueous solution.

Preconditioning of this nature is carried out by contacting the film stock with a solution of a reagent or reagents which precondition the stock to increase its receptivity to dye and improve the dyeing qualities thereof in general. A generally useful prewetting solution of this nature comprises an aqueous solution of sodium benzoate and sodium sulfate wherein the sodium benzoate has a concentration of 1% and the sodium sulfate of 4%. Application of a prewetting solution is carried out by dipping the sheet therein for a period of from a few seconds to one or two minutes after which excess solution is removed from the surface to be printed preparatory to application of the printing matrices. Other prewetting solutions are disclosed in the copending joint applications of William H. Ryan and Vivian K. Walworth, Serial Nos. 431,341 and 431,396, both filed on May 21, 1954. Following the just-described prewetting treatment, the film stock is printed by the application of the printing relief matrices thereto.

A dye density of 2.7 and an image resolution of 60 lines per millimeter are considered as acceptable in the commercial production of dye image-bearing products such as motion picture and other types of prints. Similar dye density is commercially acceptable in the production of overall dichroic dye polarizing sheet materials. Dye density and image resolution of this and even higher order have been achieved by the use of the basic polyethylenic compounds employed as mordants when molecularly oriented sheet stock, such as polyvinyl alcohol and in which such a mordant is incorporated, has been printed with the aid of washoff relief matrices to provide dichroic dye images therein.

In general, direct cotton dyes of an essentially elongated structure may be named as suitable for forming light-polarizing images in molecularly oriented plastic materials, and especially molecularly oriented polyvinyl alcohol. Dyes of this nature are set forth in the previously mentioned patents and, as specific examples thereof, mention may be made of Niagara Sky Blue 6B (C.I. 518) and Niagara Sky Blue (C.I. 520) for cyan; Solantine Red 8BL (C.I. 278), Solantine Pink 4BL (C.I. 353) for magenta; and Solantine Yellow 4GL (Prototype 53) and Stilbene Yellow 3GA (C.I. 622) for yellow.

Throughout the specification and claims, reference has been made to orientable, linear, high molecular weight, hydroxyl-containing, vinyl polymers and specifically to polyvinyl alcohol. Such reference will be understood to include polymers which have not been completely hydrolyzed, as for example partially hydrolyzed polyvinyl acetate, and is further intended to embrace polymers which may or may not have been subjected to stabilization by treatment with boric acid or other cross-linking agent, provided the polymeric material exhibits essentially the properties recognized by those skilled in the art as characteristic of commercially available polyvinyl alcohol.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. A light-polarizing film material of improved efficiency including a transparent base layer, and at least a layer superimposed thereupon having its molecules substantially oriented in a given direction, said superimposed layer comprising a transparent, high molecular weight, water-soluble, hydroxyl-containing vinyl polymer, at least a dichroic direct cotton dye, and an organic compound constituting a dye mordant, the molecular orientation of said superimposed layer providing a high axial ratio essential to effective light polarization but thereby also tending to cause a diminished dye receptivity, said dye mordant having an affinity for said dye substantially counterbalancing said diminished dye receptivity and providing substantial insolubilization of said dye, said dye mordant comprising an amino-substituted linear polymer selected from the class consisting of (a) amino-substituted alkanes containing at least one member derived from the group consisting of vinyl and allyl groups; (b) heteropolymers comprising amino-substituted alkanes and an alkane group containing at least one member of the group consisting of hydroxyl, carboxyl, halogen, ester groups, acetal, carbethoxy, aminoethoxy, and keto; and (c) heteropolymers comprising an amino ether group and an alkane group containing at least one member from the group consisting of hydroxyl, carboxyl, halogen, ester groups, acetal, carbethoxy, and keto, said light-polarizing film material, by reason of the coaction of said vinyl polymer, said dye and said dye mordant, having a dye density which is substantially higher than that of a light-polarizing film material comprising a similar vinyl polymer and dye, but which is devoid of said dye mordant.

2. A light-polarizing film material as defined in claim 1 wherein said amino-substituted linear polymer is water soluble.

3. A light-polarizing film material as defined in claim 1 wherein said amino-substituted linear polymer is a water-soluble salt.

4. A light-polarizing film material as defined in claim 1 wherein said amino-substituted linear polymer is a water-soluble salt of polyvinylamine.

5. A light-polarizing film material as defined in claim 1 wherein said amino-substituted linear polymer is a copolymer of vinyl alcohol and vinylamine.

6. A light-polarizing film material as defined in claim 1 wherein said amino-substituted linear polymer is a β-aminoethyl ether of polyvinyl alcohol.

7. A light-polarizing film material as defined in claim 1 wherein said amino-substituted linear polymer is predominantly concentrated adjacent a surface of the molecularly oriented layer into which said dichroic direct cotton dye is imbibed.

8. A light-polarizing film material as defined in claim 1 wherein said amino-substituted linear polymer substantially constitutes a surface stratum of the molecularly oriented layer into which said dichroic direct cotton dye is imbibed.

9. A light-polarizing film material as defined in claim 1 wherein said dichroic direct cotton dye is distributed differentially throughout the area of the molecularly oriented layer in the form of at least one light-polarizing image.

10. A light-polarizing film material as defined in claim 1 wherein are included two molecularly oriented layers, the molecular orientation of one of said layers being substantially at 90° to that of the other, said layers being bonded to opposite faces of a transparent supporting layer, and said dye being printed in the form of a pair of stereoscopic images, one on each surface of a respective molecularly oriented layer, with said images in proper register.

11. A light-polarizing film material as defined in claim 10 wherein each of said pair of stereoscopic images is multicolored and is composed of a plurality of subtractive color-separation images.

12. A light-polarizing film material as defined in claim 1 wherein said dichroic direct cotton dye is distributed substantially uniformly throughout the area of the molecularly oriented layer.

13. A light-polarizing film material as defined in claim 1 wherein said hydroxyl-containing vinyl polymer is polyvinyl alcohol.

14. A process for forming a light-polarizing film material of improved efficiency comprising the steps of casting into a film a solution of a transparent, molecularly orientable plastic material, drying said film, stretching said film in a given direction to provide a high axial ratio and an accompanying high order of molecular orientation, superimposing said film on a transparent base and bonding said film thereto, imbibing a dichroic direct cotton dye into the exposed surface of said film, and, at a stage of said process prior to the imbibition of said dye into said surface, adding to said plastic material a substance providing therewithin a basic polyethylenic compound serving as a mordant for said dye.

15. A process for forming a light-polarizing film material as defined in claim 14 wherein said plastic material is a material selected from the group consisting of (a) polyvinyl alcohol, (b) copolymers of vinyl alcohol, and (c) mixtures of polyvinyl alcohol and said copolymers.

16. A process for forming a light-polarizing film material as defined in claim 15 wherein said material selected from the group designated as (a) and (b) is treated with ethylene imine.

17. A process for forming a light-polarizing film material as defined in claim 14 wherein said polyethylenic compound is the reaction product of ethylene imine with a material which is predominantly polyvinyl alcohol.

18. A process for forming a light-polarizing film material as defined in claim 14 wherein said dye is applied to said surface from a printing matrix to provide a light-polarizing image.

19. A process for forming a light-polarizing film material as defined in claim 14 wherein said dye is applied substantially uniformly throughout the area of said surface.

References Cited in the file of this patent

UNITED STATES PATENTS

| | | |
|---|---|---|
| 2,076,131 | Rein | Apr. 6, 1937 |
| 2,198,621 | Izard | Apr. 30, 1940 |
| 2,237,567 | Land | Apr. 8, 1941 |
| 2,239,718 | Izard | Apr. 29, 1941 |
| 2,246,087 | Bailey et al. | June 17, 1941 |
| 2,264,190 | Sherts et al. | Nov. 25, 1941 |
| 2,267,842 | Schlack | Dec. 30, 1941 |
| 2,289,714 | Land | July 14, 1942 |
| 2,346,766 | Land | Apr. 18, 1944 |
| 2,397,276 | Land | Mar. 26, 1946 |
| 2,423,503 | Land et al. | July 8, 1947 |
| 2,445,555 | Binda | July 20, 1948 |
| 2,454,515 | Land | Nov. 23, 1948 |
| 2,484,423 | Reynolds | Oct. 11, 1949 |
| 2,632,757 | Reynolds | Mar. 24, 1953 |
| 2,710,801 | Minsk et al. | June 14, 1955 |